United States Patent
Buil et al.

(10) Patent No.: US 7,840,292 B2
(45) Date of Patent: Nov. 23, 2010

(54) MULTIUSER PLAYLIST GENERATION

(75) Inventors: Vincentius Paulus Buil, Eindhoven (NL); Mauro Barbieri, Eindhoven (NL); Fabio Vignoli, Veldhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 837 days.

(21) Appl. No.: 11/721,216

(22) PCT Filed: Dec. 8, 2005

(86) PCT No.: PCT/IB2005/054433

§ 371 (c)(1),
(2), (4) Date: Jun. 8, 2007

(87) PCT Pub. No.: WO2006/097795

PCT Pub. Date: Sep. 21, 2006

(65) Prior Publication Data

US 2009/0240355 A1 Sep. 24, 2009

Related U.S. Application Data

(60) Provisional application No. 60/635,241, filed on Dec. 10, 2004.

(51) Int. Cl.
*G06F 17/00* (2006.01)
(52) U.S. Cl. ....................................................... 700/94
(58) Field of Classification Search ................... 700/94; 381/61; 704/270
See application file for complete search history.

(56) References Cited

U.S. PATENT DOCUMENTS

| | | |
|---|---|---|
| 6,657,116 B1 | 12/2003 | Gunnerson |
| 2003/0227478 A1 | 12/2003 | Chatfield |
| 2005/0038819 A1 | 2/2005 | Hicken et al. |
| 2005/0195696 A1 | 9/2005 | Rekimoto |
| 2006/0048076 A1* | 3/2006 | Vronay et al. ............... 715/850 |
| 2006/0224259 A1* | 10/2006 | Buil et al. ..................... 700/94 |

FOREIGN PATENT DOCUMENTS

| | | |
|---|---|---|
| GB | 2356283 A | 5/2001 |
| WO | 0177846 A1 | 10/2001 |
| WO | 2005022528 A1 | 3/2005 |

* cited by examiner

*Primary Examiner*—Andrew C Flanders

(57) ABSTRACT

Multi-user playlist generation is provided. Users submit their playlists; a pie chart (3-1) is displayed (S3) representing the multi-user playlist generated from the plurality of playlists, such that m the pie chart each user playlist is represented as a piece of the pie (3-11, 3-12); a first piece of the pie is selected as the user playlist from which a selection is next chosen by displaying (S5) a spinning effect with respect to the pie for a random or a pseudorandom period of time; and choosing (S7) the selection from the determined user playlist and playing the selection chosen. The selection may include a song, a piece of music, a picture, a video, a film, or a TV program. The user playlists may be provided by a user as a list of songs, a genre, an artist, or a user preference profile.

19 Claims, 3 Drawing Sheets

US 7,840,292 B2

MULTIUSER PLAYLIST GENERATION

The present invention relates to the field of playlist compilation and generation, to content association, display and selection, and to multi-user playlist compilation, presentation and selection.

In recent years, people have accumulated large collections of media content, such as music pieces, video or audio tracks on various types of media. Playlists afford users with the ability of organizing their music or other collections, based on preferences, themes, genres, artists, or occasions. During social occasions, such as parties, playlists that are used by individual users need to be coordinated, or users need to agree on what songs or other selections to play. Often selecting the next selection is a kind of social behavior, like playing music from a jukebox in a bar.

When people with different musical tastes come together, such as at a party, a public space, a family occasion, or as visitors to a host's premises, it may also be difficult to agree on what music to play. Playback devices, such as MP3's, CD players, or MiniDisc players have little means of accommodating to the tastes and preferences of several users. It is possible of course for the user to compile a new playlist for the occasion, however this can often be a time-consuming process, and it is not necessarily the case that the users will agree on a list of songs and the order in which to play them.

At present, there is no way automatically to combine multiple personal playlists into one combined multiuser playlist in a satisfactory manner without argument among the users. For example, United States Patent Application Publication No. 2003/0227478 provides a system in which users can go to a party or club situation and vote on a next song selection. However, this solution does not work when there is a little common ground for compiling a common playlist. Further, U.S. Pat. No. 6,657,116 provides multiuser playlist generation based on combining preferences. However, these references do not provide for compiling a playlist based on playlists provided by individual users. Further, these references do not provide for compiling such a multiuser playlists in a fair and transparent manner, nor of avoiding sudden style breaks in selection transitions in the compiled multiuser playlist.

Provided are a method, system, device, apparatus, and computer-readable media that embodies or carries out the functions of a multi-user playlist generating system.

A multi-user playlist may be generated by receiving a plurality of user playlists; displaying a pie chart representing the multi-user playlist generated from the plurality of playlists, such that in the pie chart each user playlist of the plurality of user playlists is represented as a piece of the pie; determining a first piece of the pie as the user playlist from which a selection is next chosen by displaying a spinning effect with respect to the pie, such that the determining is made by one of a random and a pseudorandom period of time for which the spinning effect continues; and choosing the selection from the determined user playlist and playing the selection chosen.

The selection may include a song, a piece of music, a picture, a video, a film, or a TV program.

The user playlists may be provided by a user as at least one of a list of songs, a genre of music, an artist, an era of composition or production, and a user preference profile.

The spinning effect may include the pie spinning as a wheel of fortune image with a fixed pointer displayed, or a pointer displayed as rotating about the pie, the pointer being displayed as a cue for a piece of the pie to which it points.

A size of the piece of the pie may be proportional to the length of the user playlist represented by the piece of the pie or pieces of the pie are displayed as approximately of equal size, or may be adjustable to favor one or more users.

The spinning effect may be displayed as gradually slowing down in one of a random or a pseudorandom fashion.

The choosing of the selection from the determined user playlist could be made to achieve a pleasant transition from a currently playing selection, by comparing at least one characteristic of the currently playing selection with at least one corresponding characteristic of the selections of the determined user playlist. Such a characteristic could be, for example, a genre, a tempo, an artist, a volume, or a feature calculated directly from an audio signal or a video signal.

A list of recently played selections may be maintained and the pleasant transition could then be made to minimize repeated play of the selections.

Choosing of the selection from the determined user playlist may be carried out by alternating a pleasant transition from the currently playing selection and a stark transition from the currently playing selection, by comparing at least one characteristic of the currently playing selection with at least one corresponding characteristic of the selections of the determined user playlist, such that a pleasant transition entails a similarity of selection characteristics, and a stark transition entails a lesser similarity of selection characteristics than a pleasant transition.

The pleasant transition could be made such that when no selection of sufficiently similar characteristics is found on the determined user playlist, a transition selection is selected from outside of the determined user playlist, and at least a portion of the transition selection is played before the next chosen selection on the determined user playlist.

The spinning effect could be displayed before the currently playing selection has finished playing to determine a next piece of the pie as the user playlist from which a selection is next chosen. The spinning effect may be displayed to determine a next piece of the pie as the user playlist from which a selection is next chosen, when a user commands a new spin.

Also, a multi-user playlist generating system is described. The system includes a receiver for receiving a plurality of user playlists; a display configured to display a pie chart representing the multi-user playlist generated from the plurality of playlists, such that in the pie chart each user playlist of the plurality of user playlists is represented as a piece of the pie; a playlist selector configured to determine a first piece of the pie as the user playlist from which a selection is next chosen by displaying on said display a spinning effect with respect to the pie, such that the determining is made by a random or a pseudorandom period of time for which the spinning effect continues; and a selection chooser configured to choose the selection from the determined user playlist and to cause the playing of the selection chosen.

The system may be integrated with an audio playback system, a DVD player, a personal computer, or a TV set. The audio playback device may be an MP3 player, a CD player, a mini disk player, or a jukebox.

The following discussion and the foregoing figures describe embodiments of Applicant's invention as best understood presently by the inventors however, it will be appreciated that numerous modifications of the invention are possible and that the invention may be embodied in other forms and practiced in other ways without departing from the spirit of the invention. Further, features of embodiments described may be omitted, combined selectively or as a whole with other embodiments, or used to replace features of other embodiments, or parts thereof, without departing from the spirit of the invention. The figures and the detailed description are therefore to be considered as an illustrative explanation of aspects of the invention, but should not be construed to limit the scope of the invention.

Figure 1:
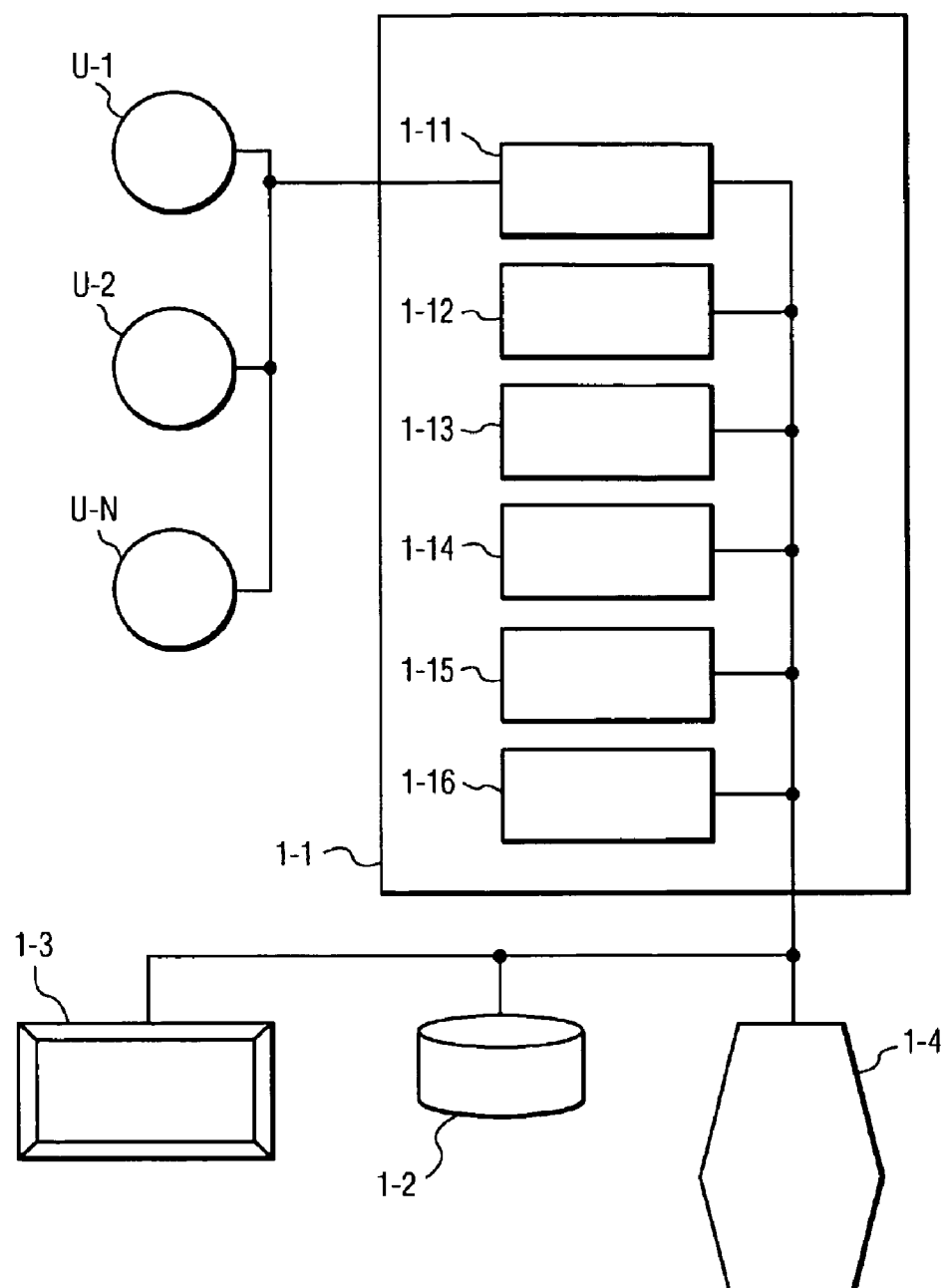
FIG. 1 is a schematic view of an embodiment of a multiuser playlist generating system.

As shown in FIG. 1, the multi-user playlist generating system 1-1 includes several modules, which will be described below. Modules of the multi-user playlist generating system 1-1, or portions thereof, and/or the activity-related document management system as a whole, may be comprised of hardware, software, firmware, or a combination of the foregoing, however some modules may be comprised of hardware for example, while other modules may be comprised of software, firmware or a combination thereof.

It is to be understood that modules of the multi-user playlist generating system 1-1 need not all be located or integrated with the same device. A distributed architecture is also contemplated for the activity-related document management system, which may "piggy-back" off of suitable modules provided by existing devices.

The following description will refer to a multi-user playlist generating system 1-1 that is physically integrated with or connected to a database 1-2 via a wired or wireless connection thereto. The database 1-2 may be embodied on a storage device such as on a hard drive of a personal computer, a personal video recorder, an entertainment system, an electronic organizer, a personal handheld device, a Jaz drive, or may be embodied as a commercial storage facility, such as a disk drive. For example, a commercial storage facility may include a storage space provided by a service provider, or residing in the network. It will be understood that the database 1-2 may include several storage devices that are connected, such that organization or grouping of content items on two or more of such devices is possible. For example, the data may be distributed over devices in a peer-to-peer network. By way of example, data derived from sensors may thus be handled. It will further be understood that the database may be understood to include one or more storage media, such as disks, including CDs, DVDs, zip disks, floppy disks, data cartridges, or the like, which can be loaded onto and retrieved by the database 1-2. However, it will be understood that the multi-user playlist generating system 1-1 is also capable of retrieving content via a network (not shown), such as a LAN, WAN, the internet, wireless network or the like, and that the database 1-2 may be remotely connected, such as via a network, including the internet. A display 1-3 and a playback device 1-4 may similarly be integrated with the multi-user playlist generating system 1-1 or be connected in one or more of the ways described above.

As shown in FIG. 1, the multiuser play generating system 1-1 may include a number of modules, including a user playlist receiver 1-11, which receives playlists from one or more users, shown as user 1, U-1, user 2, U-2, and user N, U-N. User playlist interpreter 1-12 compiles a playlist for each user based on preferences or information, such as a genre, or a personal profile, provided by the users. Playlist compiler 1-16 compiles the multiuser playlist. Playlist selector 1-13 selects an individual playlist, shown as a slice of a pie 3-11, 3-12 in FIG. 3. Selection chooser 1-14 selects a selection, such as a song or piece of music or audio, from the playlist selected by playlist selector 1-13. Transition control 1-15 controls a transition or bridge selection between a currently playing selection and a next playing selection, as will be explained in greater detail below.

Figure 2:
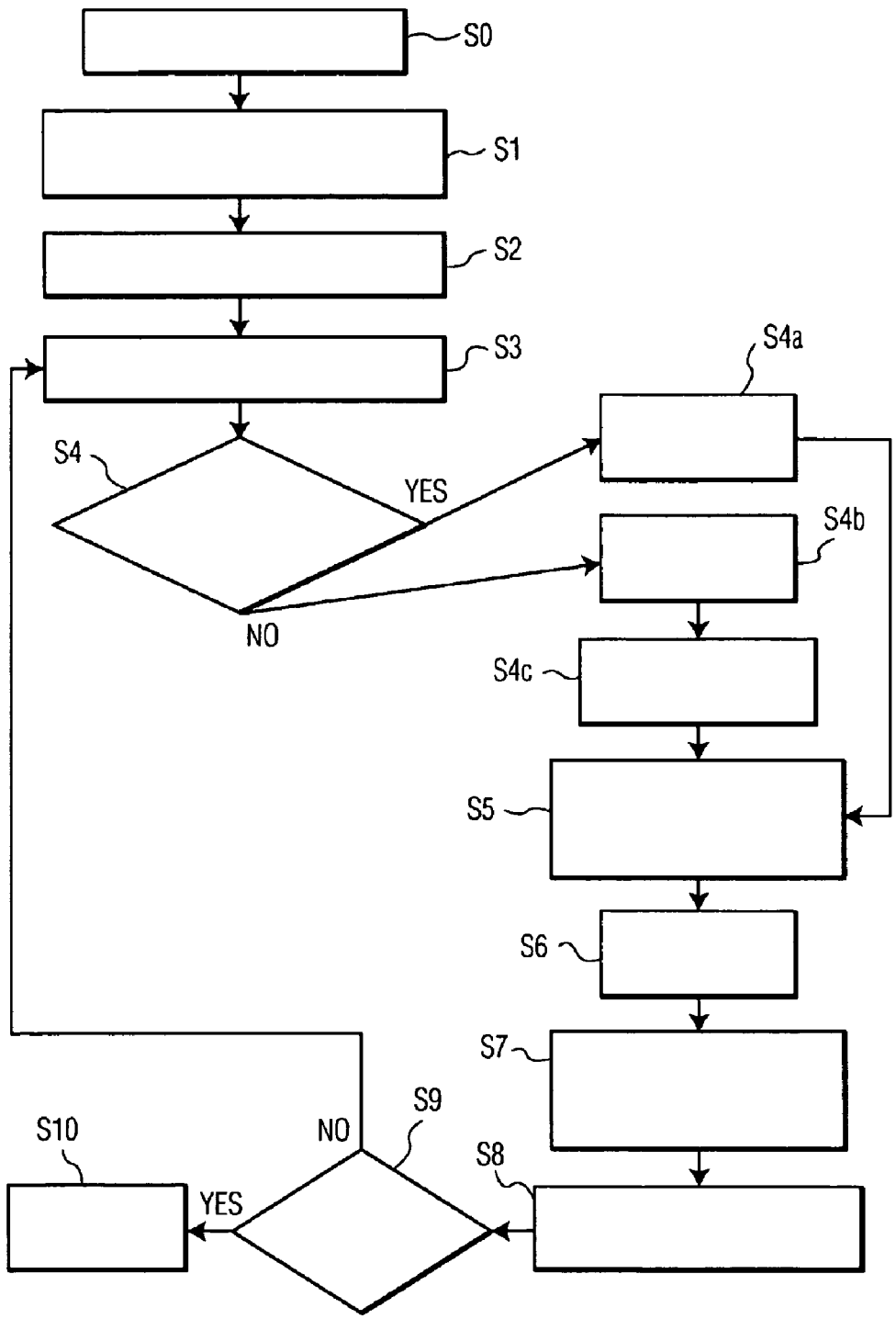
FIG. 2 is a flowchart showing an operation of a system according to the present invention.

An operation of a multiuser generating system 1-1 will now be described with reference to FIGS. 1-3. Users 1-N submit their individual playlists to the multi-user playlists generating system 1-1. The users may submit their playlists in a variety of ways, including by uploading their individual playlists to a central node, such as an MP3 player, a playback device, or the multiuser playlists generating system, in a wired or a wireless manner. Also, one or more users may submit their playlists via a network, including the Internet. Such playlists may comprise songs, musical pieces or other audio information, video, movies, or television programs, pictures, home video clips or footage, websites, or multimedia files or items, or other types of content items. The format of the selections contained on the playlist may include any form suitable for storing or conveying the types of files and data described above, including MP3, JPEG, MPEG (including all versions and releases of the foregoing).

User playlist receiver 1-11 receives the user playlist at S0. The submissions are interpreted by user play list interpreter 1-12 at S1. For instance, one or more users may submit profiles or user preference information, including for instance criteria for songs, a genre, an artist, an era, or other criteria. Based on this information, at S1, user playlist interpreter 1-12 compiles a playlist for that user. Based on these playlists received and interpreted, playlist compiler 1-16 compiles a multi-user playlist (at S2) and displays the multiuser playlists in the form of a pie chart (at S3), wherein each slice of the pie represents one of the individual playlists received from the user.

In displaying the pie chart, at S4, it is decided by playlist compiler 1-16 whether pieces of the pie are to be displayed as of equal size or whether the size of the pieces of the pie will reflect the length of the individual playlists they represent. Accordingly, if equal pieces of pie are to be displayed, processing moves to S4a, display equal size pieces.

Otherwise processing moves to S4b, determining the sizes of the pie pieces. The size of the pieces may be proportional to the length of the individual user playlists. Accordingly, users who have submitted longer playlists will have a greater chance of having their playlist selected by the playlist selector 1-13 of the multi-user playlist generating device 1-1.

Further, according to an embodiment of the present invention, at S4c, the pieces of the pie may be displayed as larger or smaller for one or more users based on the identity of the users. For example, a piece of the pie corresponding to a user playlist submitted by the host of the party or a guest being celebrated, such as a user celebrating a birthday, may be shown as larger, so that selection will favor the piece of the host or the birthday guest. Similarly, a piece can be shown as smaller to reduce the chances of one or more users being selected. Also, selection of a combination of the foregoing features, such as unequal piece size based on length of submitted user playlist and unequal pie size based on biasing for a birthday guest may be enabled.

The choice between approximately equal size pie pieces and pie pieces of unequal size may be set as a default in the system, selected in a random or pseudorandom manner by the system, or set in advance or selected now by a user. For example, a birthday bias of a predetermined percentage may be set as a default, and a "birthday user" setting provided as a preset option. According to an aspect of the present invention, users may toggle between pie charts of these two different types, for example by clicking on the pie, for example on the center of the pie, or by dragging a mouse to the center of the pie. Further, the users may be enabled to control the relative sizes of the pieces of the pie in a finer-grained controls, such as setting a piece as a specified percentage larger or smaller, and increasing or decreasing the chance of selection of a piece by a specified amount, or the like.

Figure 3:
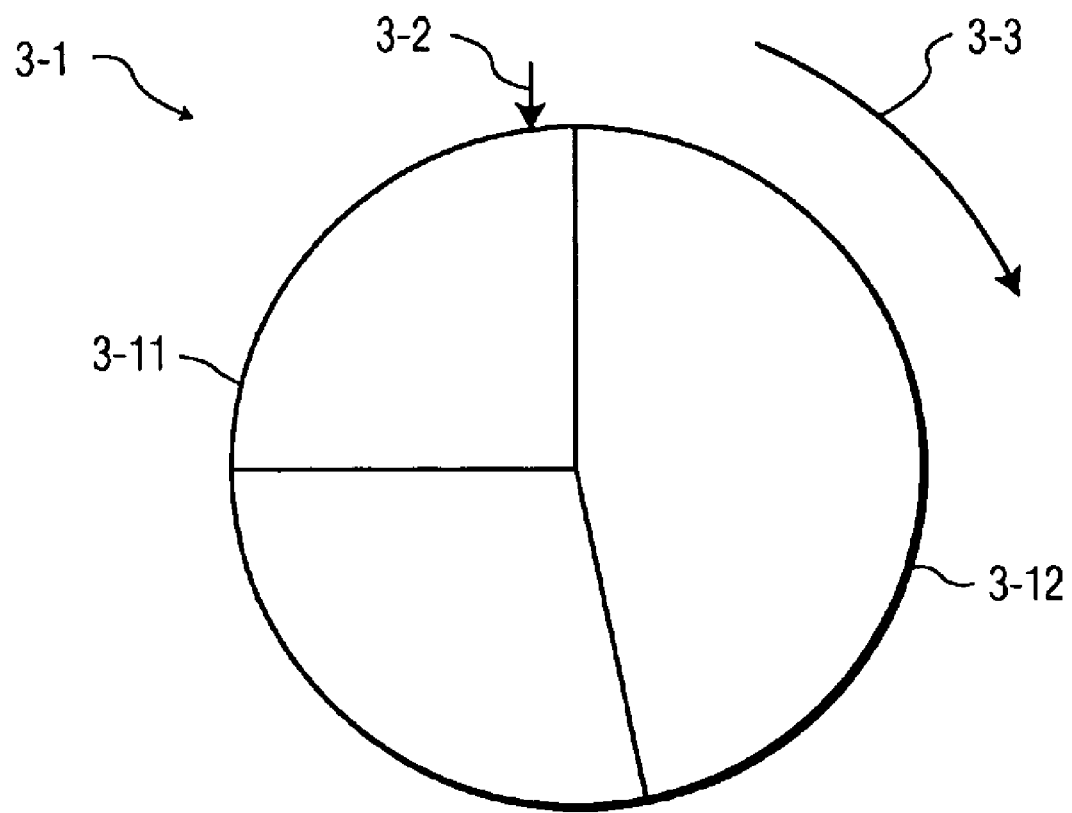
FIG. 3 is an example of a pie chart generated by a multiuser playlist generating system according to an embodiment of the present invention.

As showed in FIG. 3, the pie chart display may take the appearance of a wheel of fortune 3-1 with a pointer 3-2 which points to the piece of the pie 3-11 that represents the user playlist that has been selected.

The multiuser playlist generating system 1-1 will at this point display a spinning effect for the pie chart that simulates a spinning or revolution of the wheel of fortune (S5). This spinning effect may also be achieved by a rotation or revolution of the pointer 3-20 around the pie chart in the direction shown by the movement arrow 3-3 of FIG. 3, and accordingly, the pie may be displayed as a substantially stationary wheel of fortune, with just the pointer shown as spinning about the pie. Alternatively, both the pie and the pointer may be displayed as spinning, for example, in opposite directions (e.g. clockwise and counterclockwise.) Therefore, henceforth this spinning effect may be referred to either as a spinning of the pie chart resembling a wheel of fortune or as the spinning of the pointer 3-20 about the pie chart. The arrow 3-3 shows this spinning effect direction in a clockwise direction, however it will be understood that the spinning effect in a counterclockwise direction might also be displayed.

At S5, playlist selector 1-13 controls the spinning effect displayed. The spinning effect may be displayed for a random or a pseudorandom period of time. When the spinning effect stops, the slice of the pie to which pointers 3-2 points will be the slice from whose user playlist the next selection will be made. According to an aspect of the present invention, the spinning effect may slow down gradually for a random or pseudorandom period of time, and eventually come to a rest with the pointer 3-2 pointing to a piece of the pie 3-11, 3-12.

According to and embodiment of the present invention, at S6, a pleasant transition may be provided by transition control S6, such that the selection chosen will be not too dissimilar from a currently playing selection. Transition controller 1-15 at S6 controls the transition between a currently playing song and the next chosen selection. For example, difference vectors are generated to compare selections of the user playlist selected with the currently playing selection. Such difference vectors may be based on similarity of metadata, information such as genre, tempo, artist, era or volume, or based on features calculated directly from the audio signal, or on a combination of two or more of the foregoing. Then, a selection from the selected playlist is chosen to achieve a pleasant transition based on the generated difference vectors, that is a transition in which the next selection is not starkly different from the currently playing selection.

According to an embodiment of the present invention, such pleasant transitions can be alternated with transitions that are uncontrolled or with the deliberately "unpleasant" or stark transitions, in which the transition between the currently playing selection and the next selection is more surprising for the users because the next selection is less similar to the currently playing selection.

According to a further embodiment of the present invention, when no selection on the selected playlist is sufficiently similar to the currently playing selection to effect a pleasant transition, a "transition selection" is chosen by transition controller 1-15 for playback. The transition selection, or portion thereof, may then be played between the currently playing selection and the next selection of the selected playlists. For instance, the transition selection may be chosen from a non-selected user playlist or may be a selection that is not on any of the playlists. The transition selection will then be played and a pleasant or smooth transition could then be achieved. When a transition selection is played, users may be notified, for example by displaying inappropriate notice or display on display 1-3, to avoid user confusion.

In addition, a list of a recently played selections can be maintained in order to avoid frequent repetition of recently played selections. The length of such saved selections may be limited for example, to 10 or 20 of the recently played selections.

When a currently playing selection is finished or near finished, the spinning effect may be automatically started again to begin selection of the next selection. Also, the spinning effect may be started again responsive to user command for a next selection. For instance, a user may select an icon on the display 1-3 or click on the a pie chart to 3-1 to start the spinning effect and thereby to start selection of the a next selection.

At S8, a signal is sent to the playback device 1-2 for playing the chosen selection. At this time, at S9, determination is made as to whether the end of processing has been reached. The end processing is reached for example, when the multiuser playlist generating device 1-1 determines that no selections remain to be played on the multiuser playlist 3-1, or when a user terminates operation of the multiuser playlist generating device 1-1. If the end of processing is reached, then at S10 processing is stopped. Otherwise, processing continues with S3, and the pie chart is again displayed. As discussed, according to an embodiment of the present invention, a spinning effect may immediately be commenced before the end of the currently playing selection is reached.

In this way, playlist may be compiled and selections chosen in a fair and transparent manner based on individual playlists submitted by users.

Embodiments of the present invention provided in the foregoing written description are intended merely as illustrative examples. It will be understood however, that the scope of the invention is provided in the claims.

The invention claimed is:

1. A method of generating a multi-user playlist, comprising:
   receiving a plurality of user playlists;
   displaying a pie chart representing the multi-user playlist generated from the plurality of playlists, such that in the pie chart each user playlist of the plurality of user playlists is represented as a piece of the pie;
   determining a first piece of the pie as the user playlist from which a selection is next chosen by displaying a spinning effect with respect to the pie, such that the determining is made by one of a random and a pseudorandom period of time for which the spinning effect continues; and
   choosing the selection from the determined user playlist and playing the selection chosen.

2. The method of claim 1, wherein the selection comprises one of a song and a music file.

3. The method of claim 1, wherein the selection comprises one of a picture, a video, a film, and a TV program.

4. The method of claim 1, wherein a first user playlist of the plurality of user playlists is provided by a user as at least one of a list of songs, a genre of music, an artist, an era of composition or production, and a user preference profile.

5. The method of claim 1, wherein the spinning effect comprises the pie spinning as a wheel of fortune image with a fixed pointer displayed as a cue for a piece of the pie.

6. The method of claim 1, wherein the spinning effect comprises a pointer displayed as rotating about the pie, the pointer being displayed as a cue for a piece of the pie.

7. The method of claim 1, wherein a size of the piece of the pie is at least one of proportional to the length of the user playlist represented by the piece of the pie and larger in size than remaining pieces of the pie to favor selection of a corresponding user.

8. The method of claim 1, wherein the pieces of the pie are displayed as approximately of equal size.

9. The method of claim 1, wherein the spinning effect is displayed as gradually slowing down in one of a random and a pseudorandom fashion.

10. The method of claim 1, wherein the choosing of the selection from the determined user playlist is made to achieve a pleasant transition from a currently playing selection, by comparing at least one characteristic of the currently playing selection with at least one corresponding characteristic of the selections of the determined user playlist.

11. The method of claim 10, wherein the at least one characteristic is one of a genre, a tempo, an artist, a volume, and a feature calculated directly from an audio signal.

12. The method of claim 10, wherein a list of recently played selections is maintained and the pleasant transition is made to minimize repeated play of the selections.

13. The method of claim 1, wherein the choosing of the selection from the determined user playlist is made to alternate a pleasant transition from the currently playing selection and a stark transition from the currently playing selection, by comparing at least one characteristic of the currently playing selection with at least one corresponding characteristic of the selections of the determined user playlist, wherein a pleasant transition entails a similarity of selection characteristics, and a stark transition entails a lesser similarity of selection characteristics than a pleasant transition.

14. The method of claim 10, wherein the pleasant transition is made such that when no selection of sufficiently similar characteristics is found on the determined user playlist, a transition selection is selected from outside of the determined user playlist, and at least a portion of the transition selection is played before the next chosen selection on the determined user playlist.

15. The method of claim 1, wherein the spinning effect is displayed before the currently playing selection has finished playing to determine a next piece of the pie as the user playlist from which a selection is next chosen.

16. The method of claim 1, wherein the spinning effect is displayed to determine a next piece of the pie as the user playlist from which a selection is next chosen, when a user commands a new spin.

17. A multi-user playlist generating system, comprising:
a user playlist receiver configured to receive a plurality of user playlists;
a playlist compiler configured to compile a pie chart representing the multi-user playlist generated from the plurality of playlists received by said user playlist receiver, such that in the pie chart each user playlist of the plurality of user playlists is represented as a piece of the pie;
a playlist selector configured to determine a first piece of the pie as the user playlist from which a selection is next chosen by displaying on said display a spinning effect with respect to the pie, such that the determining is made by one of a random and a pseudorandom period of time for which the spinning effect continues; and
a selection chooser configured to choose the selection from the user playlist determined by said playlist selector, and to cause the playing of the selection chosen.

18. The system of claim 17, wherein the device is integrated with at least one of an audio playback system, a DVD player, a personal computer, and a TV set.

19. The system of claim 18, wherein the audio playback device is at least one of an MP3 player, a CD player, a mini disk player, and a jukebox.

* * * * *